United States Patent [19]

Hammond

[11] Patent Number: 4,596,618

[45] Date of Patent: Jun. 24, 1986

[54] METHOD OF MAKING A FITTED SHEET WITH ELASTIC RESTRAINTS

[75] Inventor: Philip G. Hammond, Outagamie County, Wis.

[73] Assignee: Kimberly-Clark Corporation, Neenah, Wis.

[21] Appl. No.: 580,984

[22] Filed: Feb. 16, 1984

Related U.S. Application Data

[62] Division of Ser. No. 367,206, Apr. 12, 1982, Pat. No. 4,461,049.

[51] Int. Cl.[4] .................. B32B 7/08; B32B 31/00; B31F 1/00; A47G 9/04
[52] U.S. Cl. .................. 156/164; 156/201; 156/267; 156/269; 156/299; 5/499; 5/495; 5/487
[58] Field of Search .......... 5/496, 498, 499, 500, 5/487, 495; 428/99, 230; 156/93, 85, 164, 163, 229, 494, 201, 204, 270, 269, 299, 302, 291, 217, 267

[56] References Cited

U.S. PATENT DOCUMENTS

| | | | |
|---|---|---|---|
| 1,359,526 | 11/1929 | Ray | 5/499 |
| 2,662,234 | 12/1953 | Citrou | 5/497 |
| 3,056,245 | 10/1962 | Baum et al. | 5/496 |
| 3,148,388 | 9/1964 | Espersen | 5/497 |
| 3,321,782 | 5/1967 | Hrubecky et al. | 5/487 |
| 3,380,086 | 4/1968 | McCurry | 5/497 |
| 3,591,875 | 7/1971 | Zipf et al. | 5/487 |
| 3,621,498 | 11/1971 | Cooper | 5/498 |
| 3,638,252 | 2/1972 | Palenske | 5/497 |
| 3,654,015 | 4/1972 | Purcell et al. | |
| 3,694,832 | 10/1972 | Jamison | 5/497 |
| 3,739,408 | 6/1973 | Pagels | 5/497 |
| 3,785,897 | 1/1974 | Zipf | 156/201 |
| 3,902,938 | 9/1975 | Eller et al. | 156/201 |
| 3,957,557 | 5/1976 | Fraige | 156/229 |
| 4,192,032 | 3/1980 | Geraci | 5/499 |
| 4,336,635 | 6/1982 | Lantz | 5/498 |
| 4,412,881 | 11/1983 | Sigl | 156/270 |
| 4,425,173 | 1/1984 | Frick | 156/270 |

FOREIGN PATENT DOCUMENTS 2914971  10/1979  Fed. Rep. of Germany.

Primary Examiner—Edward Kimlin
Assistant Examiner—L. Falasco
Attorney, Agent, or Firm—William D. Herrick

[57] ABSTRACT

Disposable fitted sheets and method for making them. The sheets are formed without necessitating prior cutting by folding edges of the material and attaching the folded-over edges along diagonal lines associated with each corner. Elastic bands cooperate with each pocket to maintain the fit on the corners of the mattress. The bands are fastened in a stretched condition to the folded-over edges while the sheet is in a flat state. The process of the invention is particularly adapted to continuously forming such sheets which may be formed from a variety of inexpensive materials. Sheets of the invention are particularly useful in hospitals and nursing homes where frequent bedding changes may be needed.

7 Claims, 7 Drawing Figures

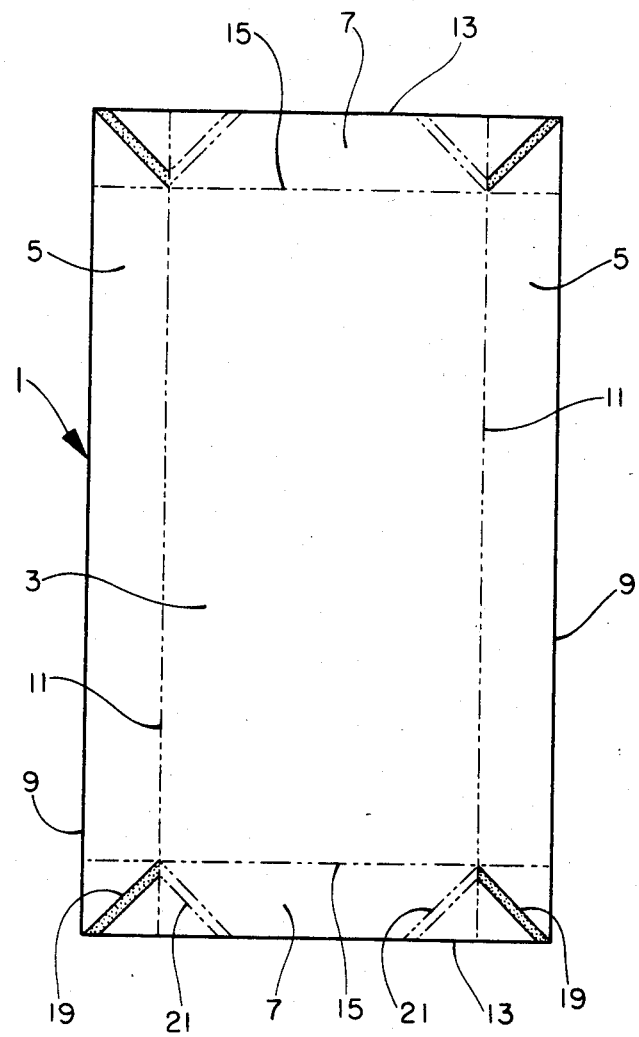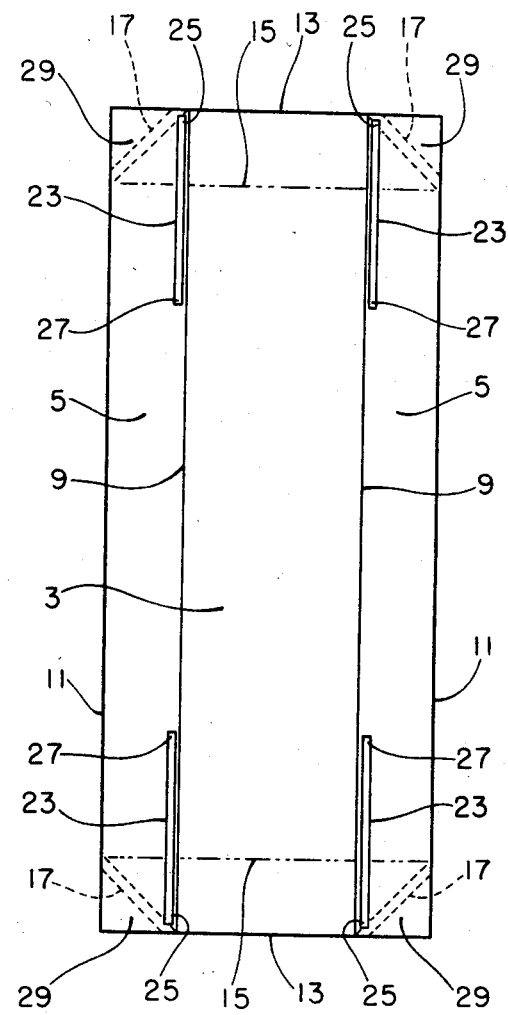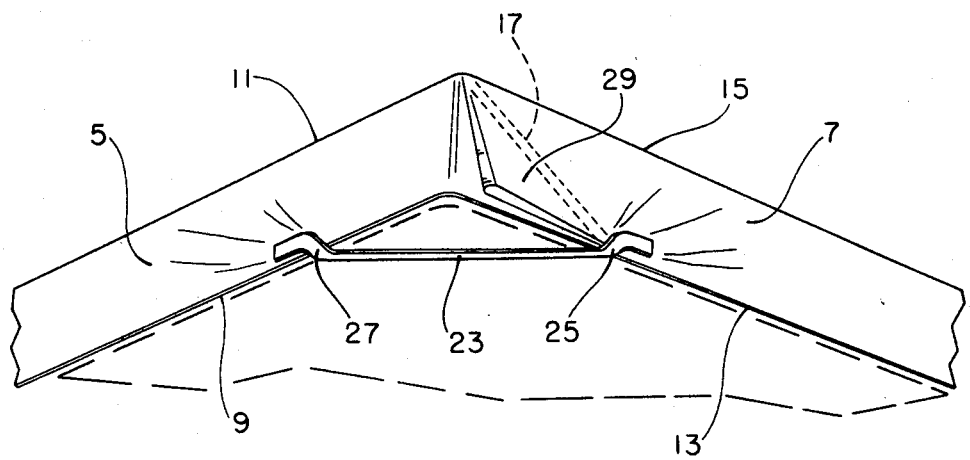

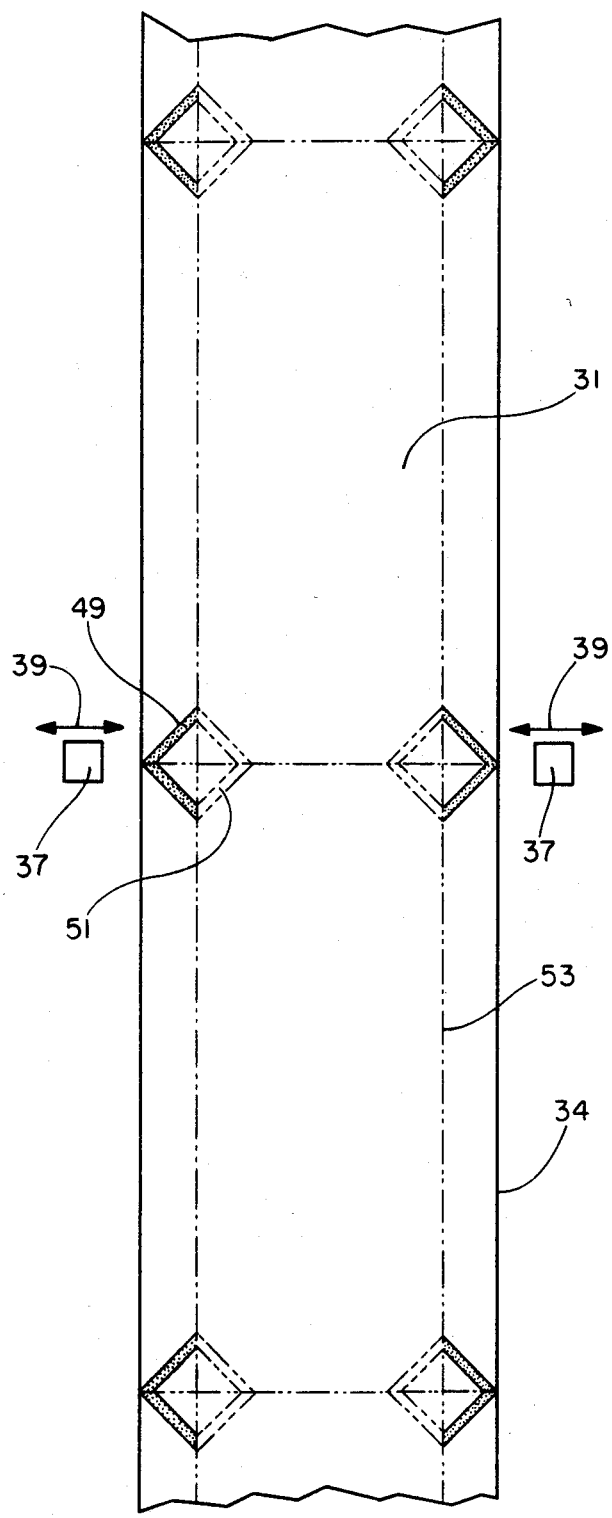
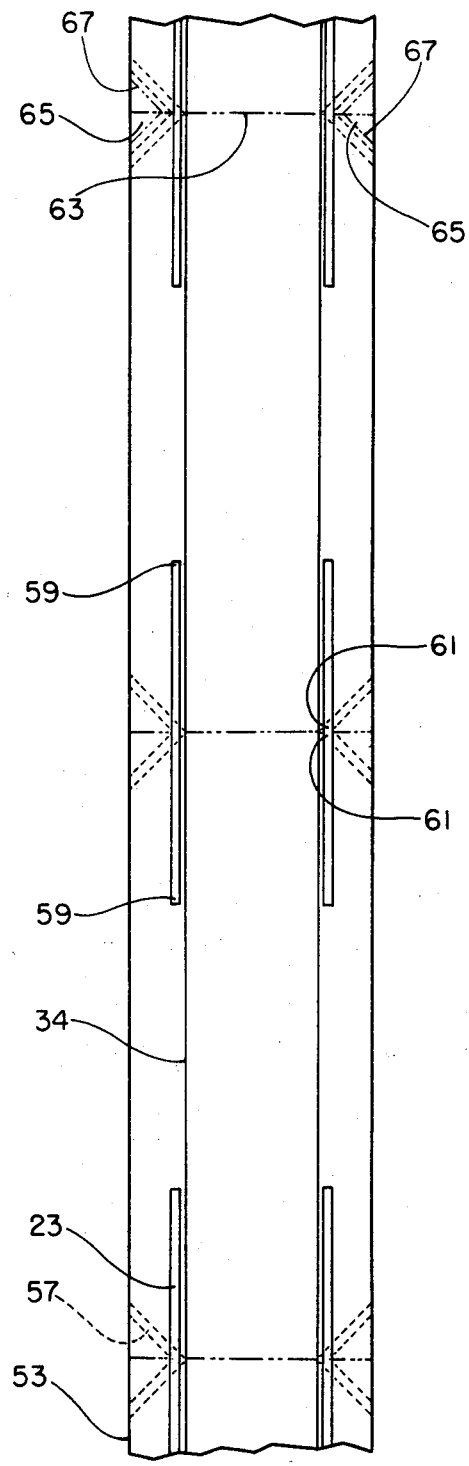
FIG. 5
FIG. 6

METHOD OF MAKING A FITTED SHEET WITH ELASTIC RESTRAINTS

This application is a division, of application Ser. No. 367,206, now U.S. Pat. No. 4,461,049.

BACKGROUND OF THE INVENTION

1. Field of the Invention

This invention relates to coverings for mattresses, and more particularly to sheets with fitted covers in combination with elastic means to aid in maintaining the fit of the corners on the mattress. The invention especially pertains to disposable sheets with their attendant advantages and benefits.

2. Description of the Prior Art

Fitted sheets are well-known. One type consists of sheets which are restrained from moving relative to the mattress only by the fitted corners, as exemplified by Ford et al U.S. Pat. No. 2,695,414. A second type combines fitted corners with elastic means of various kinds to assist holding the sheet in place. An example of this type is Cobb U.S. Pat. No. 3,114,156. A third type consists of those sheets in which the elastic properties of the sheet material itself are used to maintain a proper fit, such as described in May U.S. Pat. No. 2,942,280.

Fitted sheets may also be divided by the method of their manufacture. One group contains those manufactured by cutting the base material into individual blanks of the size and shape required to suit the corner design and then properly attaching the previously cut edges to form the corners. Black U.S. Pat. No. 2,569,627 illustrates a sheet manufactured in this manner. A second group contains sheets which can be fabricated without cutting the sheet material prior to forming the corners. An example is Hrubecky et al U.S. Pat. No. 3,321,782. Sheets made according to the second group are readily adapted to a method of continuous manufacture from rolls of material.

Fitted sheets may be considered as reusable or disposable. Disposable sheets are attractive for use in hospitals and nursing homes. To qualify for disposable use, sheets must be low in cost. They are preferably manufactured by a continuous process, because that process is normally higher in volume and therefore less expensive than manufacturing sheets from individual blanks.

Disposable sheets require the use of inexpensive materials such as paper tissue or nonwoven webs of synthetic polymers such as polypropylene. These materials are comfortable, easy to use, and commercially available in rolls suitable for continuous methods of manufacture. Materials which are inherently elastic are usually too expensive for use as disposable sheet base material.

Corner pockets are readily formed in sheets of tissue or nonwoven polymers by well known methods, which may vary with the particular materials. Unfortunately, these materials, especially the polymers, tend to be slippery when utilized as bed sheets. Even with pockets formed in the four corners, the sheets tend to slide out of position during use.

SUMMARY

The invention relates to a fitted sheet structure that is especially suitable for a disposable sheet and which includes elastic means to aid in maintaining the fit of the sheet on the mattress. The sheet includes corner pockets which are formed without prior cutting of the sheet material by folding over the edges of the material and attaching the folded-over edges to the underlying material along diagonal lines associated with each corner. An elastic band cooperates with each pocket to aid in maintaining the fit of the corners on the mattress. The bands are fastened in a stretched condition, without prior cutting of the base material, to the folded-over and attached edges at predetermined fastening points while the sheet is in a flat state. When placed in position on the mattress, the elastic bands pass diagonally under respective corners of the mattress. The sheet may be advantageously manufactured by a continuous process from a web of material, but the invention is not limited to fitted sheets made on a continuous basis. The method used to attach the base material to itself may vary with the material, as may the elastic band material and method of fastening the bands.

BRIEF DESCRIPTION OF THE DRAWINGS

FIG. 1 is a top view of a blank of sheet material from which the fitted sheet of this invention may be fabricated;

FIG. 2 is a top view of the completed sheet in a flat form, which occurs during the manufacturing process;

FIG. 3 is a fragmentary perspective view of one corner of the fitted sheet in the operative state on a mattress;

FIG. 5 is a top view of a web of base material illustrating the placement of adhesive during a continuous method of manufacture;

FIG. 6 is a top view of a web showing the edges folded over and attached and the elastic bands fastened in place during a continuous method of manufacture.

DETAILED DESCRIPTION OF THE PREFERRED EMBODIMENT

Figure 4:
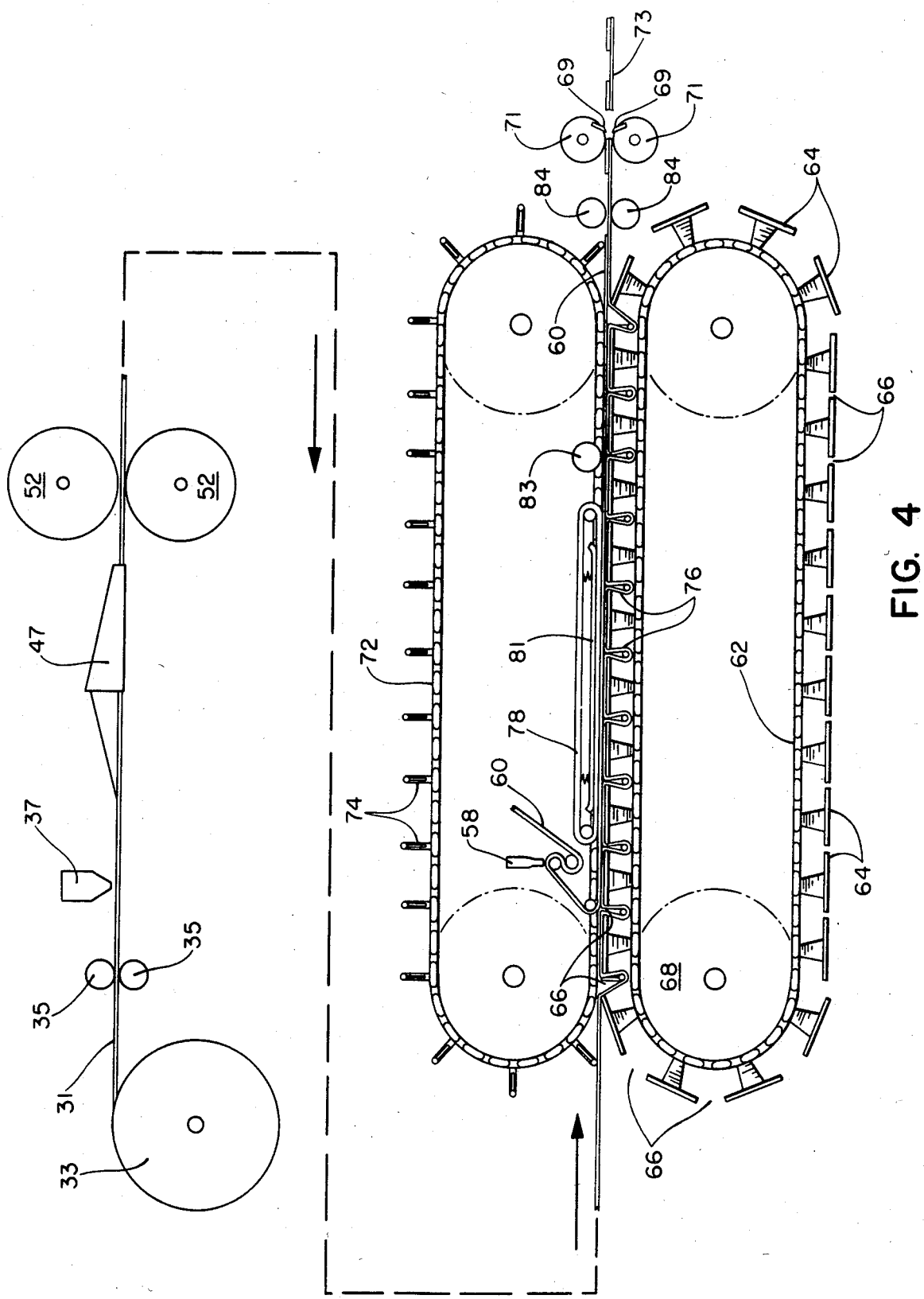
FIG. 4 is a schematic elevational illustration of an apparatus for continuously manufacturing sheets from a material compatible with adhesives.

Referring to FIG. 1, reference number 1 indicates a blank of flexible base material from which the sheet comprising the present invention may be fabricated. Suitable materials include woven textiles and disposable materials such as nonwoven webs, plastic film reinforced paper, and various types of plastic film. An especially suitable material is a nonwoven polypropylene web such as that marketed by Kimberly-Clark Corporation under the trademark "EVOLUTION". The invention is not limited to the specific type of material. The sheet comprises a rectangular central portion 3, a pair of opposed side panels 5, and a pair of opposed end panels 7. Each side panel is bounded by an exterior edge 9 and an interior edge 11. Each end panel is bounded by an exterior edge 13 and an interior edge 15. The central portion is intended to cover the top portion of a mattress, and the side and end panels are intended to cover respective sides and ends of the mattress.

To form corner pockets, each side panel is folded over along interior edge 11 so the side panels attain facing contact with respective common face portions of the underlying central portion, as shown in FIG. 2. Each side panel is attached to at least one end panel when the sheet is to be used as a top sheet; if the sheet is to be used as a bottom sheet, each side panel is attached to both end panels. Attachment occurs along diagonal lines 17 which extend from the intersections of edges 9 and 13 to the points where edges 11 coincide with edges 15. The drawings show the attachment lines to be positioned at a 45° angle to edges 13, but the attachment lines may be positioned at angles from about 30° to 60° without detracting from the utility of the corner pockets.

The nature of attachment lines 17 may differ according to the type of sheet material. For example, a sheet made from a woven textile may be sewn. Sheets formed from a thermoplastic nonwoven web such as fibrous polyproylene may be suitably attached by the application of heat and pressure. A base material of plastic film is preferably attached with hot melt adhesives.

If the sheet is to be fabricated from material which is attachable to itself by sewing or heat sealing, the side panels are folded over onto the central portion and end panels prior to attachment, as described above. If the sheet is made from a material which requires an adhesive, a modified procedure is required. Lines of adhesive are applied to at least one pair of corners of the unfolded blank of FIG. 1, as indicated by lines 19. The adhesive lines extend diagonally from the corners to the intersection of edges 11 and 15. Alternatively, adhesive may be applied along lines 21 extending from the intersection of edges 11 and 15 toward edge 13 in mirror images of lines 19. Side panels 5 are subsequen ly folded over along edge 11, and the panels are firmly pressed onto the underlying end panels along the adhesive lines to create permanent bonds.

Pairs of elastic bands 23 for aiding in maintaining proper fit of the pockets are fastened to the folded-over and attached side panels along lines generally parallel to the side panels and in cooperation with the attachment lines. In the embodiment shown in FIG. 2, two pairs of bands are employed for a bottom sheet. The material comprising the bands and the method of fastening them to the sheet may vary with the sheet material. Sheet materials, such as polyethylene film, that are compatible with adhesives may employ bands of natural rubber fastened with a hot melt adhesive. A heat sealable base material such as a polypropylene web may use bands which are heat sealable; an illustrative heat sealable band material is a polymer sold under the trademark "TUFTANE". Bands used with woven textile sheets may be fastened by sewing. The bands are fastened in a stretched condition, preferably adjacent the edges 9, as shown in FIG. 2 inner end 25 of each band is fastened between the interior and exterior edges of the associated end panel with the preferred fastening point located coincident with the attachment line 17. Outer end 27 of each band is fastened to the same side panel as end 25 at a distance from edge 13 greater than the width of end panel 7.

It will be appreciated that the distance between ends 25 and 27 is less when the sheet is operatively placed over the mattress, as shown in FIG. 3, than when the sheet is in the flat state during the manufacturing process, FIG. 2. To function properly, the band 23 must be stretched sufficiently during manufacture to allow a residual tension when the sheet is in use. The relative tension between the initial and operative states depends on the properties of the elastic material and the length of the bands. To minimize the initial tension while permitting sufficient residual tension, it is desirable to employ bands that are as long as practical and to use a "stretchy" material, i.e., material with a high elongation per unit length. The choice of elastic material may be restricted by compatibility with the sheet material; if so, the length of the bands takes on added importance. The limiting fastening point for ends 27 is the mid-point of edges 9. To keep the cost of the completed sheet to a minimum, shorter bands are preferred.

To cover the mattress, the sheet is placed on the mattress with the folded side panels underlying the central portion 3. In this condition the elastic bands are in a relaxed state, and the end panels 7 are also folded under the central portion. An elastic band is pulled downward along the corner of the mattress and then tucked diagonally under the mattress corner. Simultaneously, the folded-under side and end panels adjacent the corner will unfold so as to cover the sides and ends of the mattress in the region of that corner. The other bands are similarly positioned under the respective mattress corners. The fitted sheet thus assumes a position of utility in which it is restrained securely in place.

As shown in FIGS. 2 and 3, the construction of the fitted sheet by means of attachment lines 17 results in the formation of a triangular flap 29 of excess material at each corner. If considered objectionable, the flaps may be easily removed by cutting the sheet along lines parallel to the attachment lines 17 but displaced therefrom a small distance toward the intersection of edges 11 and 13. Under some conditions, as for example with a heat sealable base material, flaps 29 may be removed simultaneously with the forming of the attachment lines by use of suitable hot knives of conventional construction. The result is a fitted sheet possessing an especially neat appearance.

The fitted sheet may be advantageously manufactured in a continuous manner. Flexible base material may be supplied as a continuous web 31 from a supply roll 33 by means of feed rolls 35, as shown schematically in FIG. 4. The method of forming the corner pockets will vary with the type of sheet material. For a material most suitably attached to itself with adhesive, pairs of lines of adhesive are applied to the web at predetermined spaced intervals corresponding to the length of a mattress plus twice its depth. The adhesive lines are shaped as V's of predetermined height, as represented by reference numerals 49 of FIG. 5, with the points of the V's lying on the exterior edges 34 of the web. The height of the V's 49 corresponds to the depth of the mattress. Alternatively, adhesive may be deposited as V's 51 which point toward the center of the web in mirror images of V's 49. Adhesive may be applied by a pair of applicators 37 which reciprocate normal to the direction of web motion, as indicated by arrows 39, FIG. 5. The relative longitudinal motion of the web and transverse motion of the applicator result in the formation of lines 49 and 51. It will be appreciated by those skilled in the art that other apparatus for applying adhesive, such as print rolls, may be employed. After the adhesive is deposited, a conventional folding horn 47 is used to fold over the edges of the web onto the underlying portion so that fold lines pass through the tops of the V's 49 or 51. The folded-over edges are then pressed firmly to the web as by a pressure nip formed by rolls 52, thus forming attachment lines 57.

If the base material is not compatible with adhesives, a different procedure than the foregoing may be followed. The continuous web 31 is first folded over using a conventional folding horn 47 along fold lines 53 which are parallel to outer edges 34. The folded edges are then attached to the underlying web along attachment lines shaped as pairs of V's 57 with the points of the V's located at the fold lines 53. In the case of sheets made from woven textiles, attachment may occur by sewing. A polypropylene web preferably has the attachment lines created by applying heat and pressure in a manner more fully explained hereinafter.

Subsequently, stretched elastic bands 23 are fastened to the folded and attached edges. Each band is preferably fastened adjacent an edge 34. The outer ends are fastened to points 59 which are symmetrically located about the points of attachment V's 57. The span between the two outside ends is greater than the width of the V and less than the length of the sheet, as shown in FIG. 6. The bands are also fastened at two intermediate points 61 located symmetrically about the points of the V's with a span less than the width of the V. Preferably, the intermediate points 61 coincide with the respective legs of attachment lines 57.

Apparatus for fastening the bands depends on the sheet and band materials. For materials compatible with adhesives, apparatus similar to that described in U.S. Pat. No. 4,227,952 and schematically illustrated in FIG. 4 may be used. Adhesive is deposited from nozzles 58 onto two stretched elastic ribbons 60 which are supplied from supply rolls (not shown). Chain 62 carries a plurality of web support plates 64 which are arranged and spaced so as to form a substantially continuous supporting surface for the web, with small gaps 66 between them. As chain 62 traverses sprockets 68, the support plates 64 spread and form larger gaps 70. Chain 72 carries a plurality of tucker bars 74 which register with gaps 70 to push web 31 into gaps 70 to form folds 76 in the sheet material. The portions of the web which are folded into gaps 70 correspond with the portions between the outer fastening points 59. Hold-down belt 78 with pressure plate 81 firmly presses the elastic ribbons 60 to the web and maintains contact until the adhesive has set. Cut-off knife 83 is timed to sever the ribbons within the small gaps 70, but not the web. Draw rolls 84 withdraw the composite web and superimposed bands from the fastening apparatus, and the folds in the web are removed as the slack is taken out.

Figure 7:
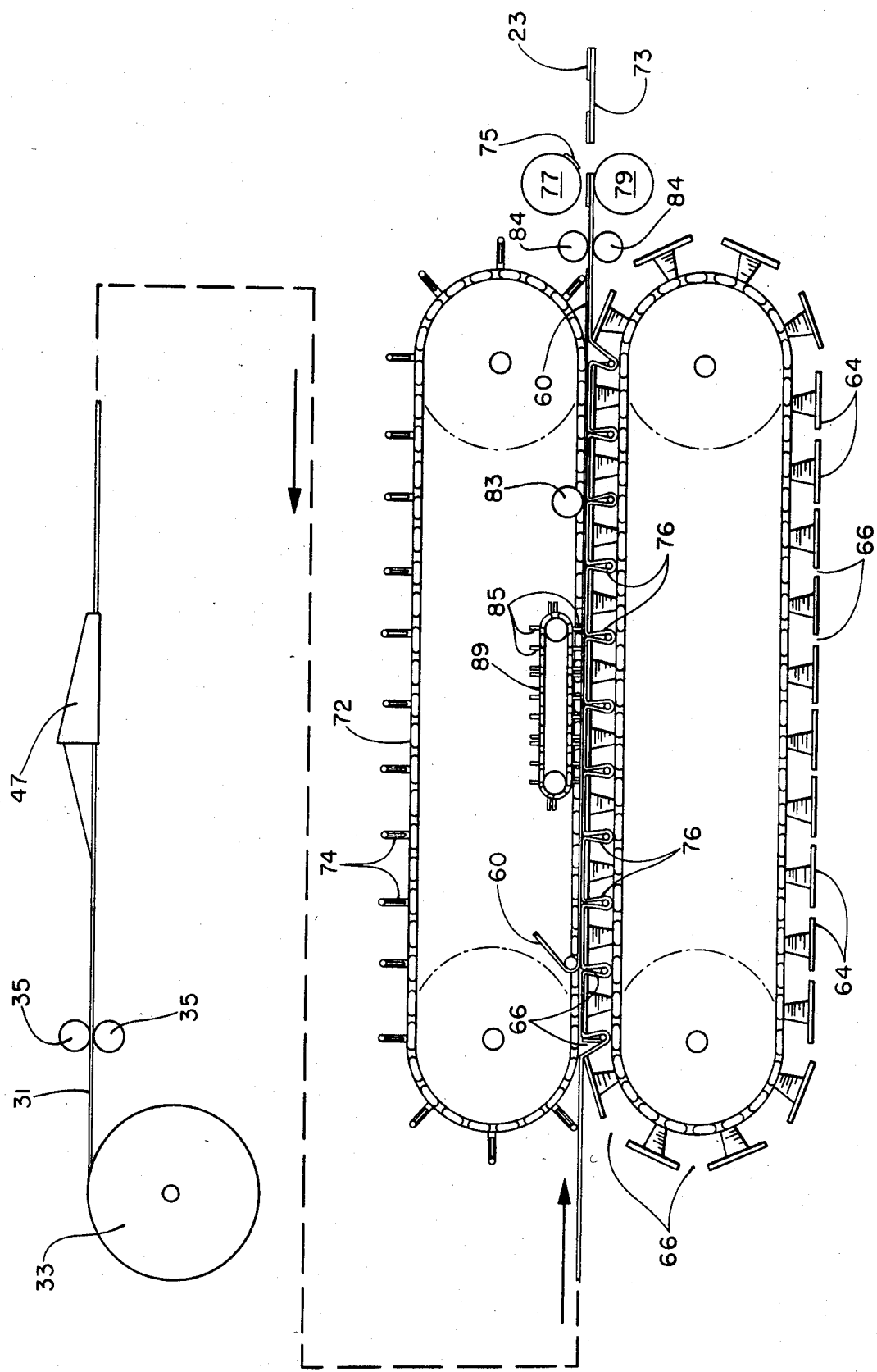
FIG. 7 is a schematic elevational illustration of an apparatus for continuously fabricating sheets from a web of heat sealable material.

Different fastening apparatus is required for sheet and band materials that are not compatible with adhesives. For example, it is contemplated that bands used with a woven textile web would be most advantageously fastened by sewing at a sewing station. Apparatus for fastening the bands to a web of heat sealable material such as non-woven polypropylene may be of the form shown schematically in FIG. 7. Chains 62 and 72, together with web support plates 64 and tucker bars 74, may be employed as previously described. Two stretched elastic ribbons 60 and folded web 31 pass between support plates 64 and traveling heaters 85 carried by chain 89. Heaters 85 are spaced so as to coincide with fastening points 59 and 61 on the web. Thus, as the web and ribbons advance between the traveling heaters and support plates, the ribbons are fastened to the web at locations 59 and 61. The ribbons are subsequently cut by knife 83, and the combination of the web and bands is withdrawn by draw rolls 84.

The final step in the continuous method of manufacture is to cut the web and bands into individual sheets 73, which are shown schematically in the flat state. The cuts are made along transverse lines 63 connecting the points of V's 57, as shown in FIG. 6. The cutting of the web into individual sheets may be accomplished by flying knives 69 mounted on rolls 71, as schematically illustrated in FIG. 4.

It may be desirable to remove triangular sections 65 of excess material that are created at each corner. This is readily accomplished by cutting along lines 67, which are parallel to V's 57 but slightly displaced therefrom toward the fold lines. Cutting lines 67 may be performed simultaneously with cutting lines 63 by properly modifying the configuration of flying knives 69.

A web composed of a heat sealable material lends itself to a very efficient method of simultaneously forming attachment lines 57, removing triangular pieces 65, and severing the web and bands along lines 63. A hot knife 75 may be mounted to the periphery of a rotary drum 77, as diagrammatically illustrated in FIG. 7. The hot knife is constructed in a configuration corresponding to lines 57, 63, and 67. As the web and ribbons pass between drum 77 and back-up roll 79, the attachment lines are formed and the web is cut along lines 63 and 67 concurrently without the necessity of separate attaching and cutting operations.

The finished sheets produced from the above continuous method are suitable for use as bottom sheets. The method can easily be modified to manufacture to sheets which include only two fitted corners with cooperating elastic bands per sheet. This is accomplished by doubling the space between the attachment V's 57 with the respective bands 23 while maintaining the spacing of the transverse cuts 63.

Thus, it is apparent that there has been provided, in accordance with the invention, an elasticized fitted mattress covering and method that fully satisfy the objects, aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A method of continuously fabricating fitted sheets which comprises the steps of:
   (a) providing an elongated web of flexible sheet material;
   (b) folding opposed longitudinal edges of the web along parallel lines into facing contact with underlying web portions;
   (c) adhesively attaching the folded portions to the underlying web at predetermined spaced intervals in lines shaped as pairs of V's, the V's having points located on the edges of the web and top portions on the fold lines;
   (d) providing a pair of elongated ribbons or stretched elastic material;
   (e) adhesively fastening each stretched ribbon to a folded portion in cooperation with an attachment V, each folded portion having a ribbon fastened thereto and adjacent the edge thereof, each ribbon being fastened at two outside points symmetrically located about the point of the V with a span greater than the width of the V and less than the predetermined spaced intervals, each ribbon being fastened at two intermediate points along a line parallel to said opposed edges, said point coinciding with respective legs of the attachment lines;

(f) cutting each ribbon between successive outside fastening points; and (g) cutting the web and ribbons transversely along lines connecting the points of the pairs of attachment V's.

2. The method of fabricating a fitted sheet as recited in claim 1 wherein the web is additionally cut transversely on lines spaced midway between two pairs of attachment V's.

3. The method of claim 1 which includes the additional step of:

(h) removing a triangular piece of material formed by each attachment V from the folded and attached web.

4. A method of continuously fabricating fitted sheets which comprises the steps of:

(a) providing an elongated web of flexible sheet material;

(b) applying lines of adhesive at predetermined spaced intervals along each longitudinal edge of the web in the shapes of pairs of V's of predetermined height, top portions of the V's lying at a predetermined distance from the edge of the web;

(c) folding the edges of the web along parallel lines coincident with the tops of the V's into facing contact with underlying common faces of the web;

(d) pressing the folded edges into contact with the underlying web along the adhesive V's to firmly bond the folded edges to the web;

(e) providing a pair of stretched elongated ribbons of elastic material;

(f) fastening each stretched ribbon to a folded edge, each folded edge having a ribbon fastened thereto in cooperation with an adhesive V, the ribbon being fastened at two outside points symmetrically located about the point of the V with a span greater than the width of the V and less than the predetermined spaced intervals, each ribbon being fastened at two intermediate points along a line parallel to said folded edges, said points coincident with respective legs of the adhesive lines;

(g) cutting each ribbon between successive outside fastening points; and (h) cutting the web and ribbons transversely along lines connecting the points of the pairs of adhesive V's.

5. The method of claim 4 wherein each folded edge has a ribbon fastened adjacent the edge thereof.

6. A method of continuously fabricating fitted sheets which comprises the steps of:

(a) providing an elongated web of flexible sheet material having parallel edges and transverse lines spaced at predetermiend intervals thereon;

(b) folding the parallel edges of the web over into facing contact with common faces of the underlying web;

(c) providing a pair of stretched elongated ribbons of elastic material;

(d) fastening each stretched ribbon to a respective folded edge and adjacent and along a line generally parallel to the edge thereof in association with the transverse lines, the ribbons being fastened at two outer points symmetrically positioned about the transverse lines with a span greater than twice the width of the folded edge and less than half the distance between successive transverse lines, the ribbon being fastened at two intermediate points symmetrically positioned about the transverse lines and adjacent thereto;

(e) cutting each ribbon between successive outside fastening points;

(f) attaching the folded edges to the underlying web along pairs of lines shaped as V's, the point of each attachment V coinciding with the intersection of the transverse line and the edge of the web, top portions of each V lying on the fold line, the attachment lines forming an angle of about 45° with the fold lines;

(g) removing pairs of triangular pieces of material formed by the attachment V's from the folded and attached web; and (h) cutting the folded and attached web and ribbons along the transverse lines.

7. The method of claim 6 wherein the steps of attaching the folded edges, removing the triangular pieces and cutting the web and ribbons are performed simultaneously.

* * * * *